United States Patent [19]
Gunn et al.

[11] Patent Number: 5,224,836
[45] Date of Patent: Jul. 6, 1993

[54] CONTROL SYSTEM FOR PRIME DRIVER OF COMPRESSOR AND METHOD

[75] Inventors: John T. Gunn, Charlotte; Daniel T. Martin, Clemmons; William H. Harden, Yadkinville, all of N.C.

[73] Assignee: Ingersoll-Rand Company, Woodcliff Lake, N.J.

[21] Appl. No.: 881,948

[22] Filed: May 12, 1992

[51] Int. Cl.$^5$ .................... F04D 17/12; F04D 27/02
[52] U.S. Cl. ............................ 417/14; 417/22; 417/32; 417/34; 417/53
[58] Field of Search ............... 417/14, 18, 22, 32, 417/34, 53

[56] References Cited

U.S. PATENT DOCUMENTS

| | | |
|---|---|---|
| 4,191,511 | 3/1980 | Stewart et al. |
| 4,232,997 | 11/1980 | Grimmer et al. |
| 4,486,148 | 12/1984 | Battah ............... 417/34 |
| 4,496,286 | 1/1985 | Gagnon ............... 417/22 |
| 4,560,322 | 12/1985 | Anderson. |
| 4,926,942 | 5/1990 | Profrock, Jr. |
| 4,940,391 | 7/1990 | Elms et al. |

OTHER PUBLICATIONS
SAE Technical Paper Series 870385, Feb. 1987.
SAE Technical Paper Series 870777, Apr. 1987.

Primary Examiner—Richard A. Bertsch
Assistant Examiner—David W. Scheuermann
Attorney, Agent, or Firm—Glenn B. Foster; Victor M. Genco, Jr.

[57] ABSTRACT

A compressor, used for compressing a working fluid to be discharged into a reservoir, includes at least one compressor element. A prime driver, capable of operating at varying angular velocities, applies motive force to the compressor. A ratio maintaining device, disposed between each compressor element and the prime driver, ensures that a ratio defined as an angular velocity of the compressor element divided by the angular velocity of the prime driver remains constant. The prime driver is typically internal combustion engine powered. A controllable fuel valve is in communication with the prime driver and is positionable for controlling a fuel flow to the prime driver. A controller positions the fuel valve based upon a combination of parameters including a variable setpoint reservoir pressure, ambient pressure and ambient temperature, wherein the prime driver is operated at an angular velocity at which the actual pressure at the reservoir can be maintained at the setpoint reservoir pressure. The controller is microprocessor or microcomputer based.

31 Claims, 7 Drawing Sheets

CONTROL SYSTEM FOR PRIME DRIVER OF COMPRESSOR AND METHOD

BACKGROUND OF THE INVENTION

This invention relates generally to controllers for compressors and more particularly to controllers which are applied to control the operation of internal combustion engine prime driver driven compressors.

Electronic controllers have been applied to a great variety of circumstances including controlling the angular velocity of compressors which are often used in the process plant industries. The compressors used in industrial applications are typically electrically powered which operate at a constant angular velocity. However, in locations where it is difficult or impractical to provide an external electric source to power the prime driver of the compressor (such as in portable compressor applications), it is highly desirable to have an internal combustion engine driven compressor. While an electrically driven compressor must operate at constant speed, the angular velocity of internal combustion engine prime drivers, by comparison, can be varied to better accommodate changes in ambient conditions, setpoint pressure and other factors. Control of the angular velocity of the internal combustion engine prime drivers is therefore much more complex than with the electrically powered prime drivers (or other constant speed prime drivers).

Previously, electronic controllers have been applied to control the angular velocity of internal combustion engine prime driver and compressor combinations which are coupled to also drive an electric generator. Since the generator requires a substantially constant angular velocity for proper operation regardless of operating conditions, to maintain a constant frequency, the function of the controller for these internal combustion engine prime driver —centrifugal compressor— generator combinations is to produce a constant angular velocity under all conditions. In the present invention, the angular velocity is maintained at a target value which varies in response to changes in ambient conditions and loading conditions.

This variation of setting of angular velocity for varying conditions permits the compressor to be run at its most efficient state depending upon the specific loading conditions. In the prior internal combustion engine driven centrifugal compressor-generator combinations, it was often necessary to use considerably more energy than necessary by running the compressor at higher angular velocities than necessary (in cold weather), or, in hot weather, to accept a lower than desired discharge pressure because the speed was too low.

To produce a truly energy efficient internal combustion engine prime driver—compressor combination capable of maintaining discharge pressure over a wide ambient range, it is important to ensure that the controller has the capability of being programmed to be able to drive the internal combustion engine prime driver at its most efficient angular velocity based upon the present operating mode. It is also important to ensure that the angular velocity of the prime driver remains within close limits to that which the controller is setting it at.

The foregoing illustrates limitations known to exist in present controllers for centrifugal compressors. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus including a compressor for compressing a working fluid to be discharged into a reservoir, the compressor includes at least one compressor element. A prime driver, capable of operating at varying angular velocities, for applying motive force to the compressor. A ratio maintaining device, disposed between each compressor element and the prime driver, for ensuring that a ratio defined as an angular velocity of the compressor element divided by the angular velocity of the prime driver remains constant. A controllable fuel valve is in communication with the prime driver, and is positionable for controlling a fuel flow to the prime driver. A controller for positioning the fuel valve based upon a combination of parameters including a variable setpoint reservoir pressure, ambient pressure and ambient temperature, wherein the prime driver is operated at an angular velocity at which the actual pressure at the reservoir can be maintained at the setpoint reservoir pressure.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
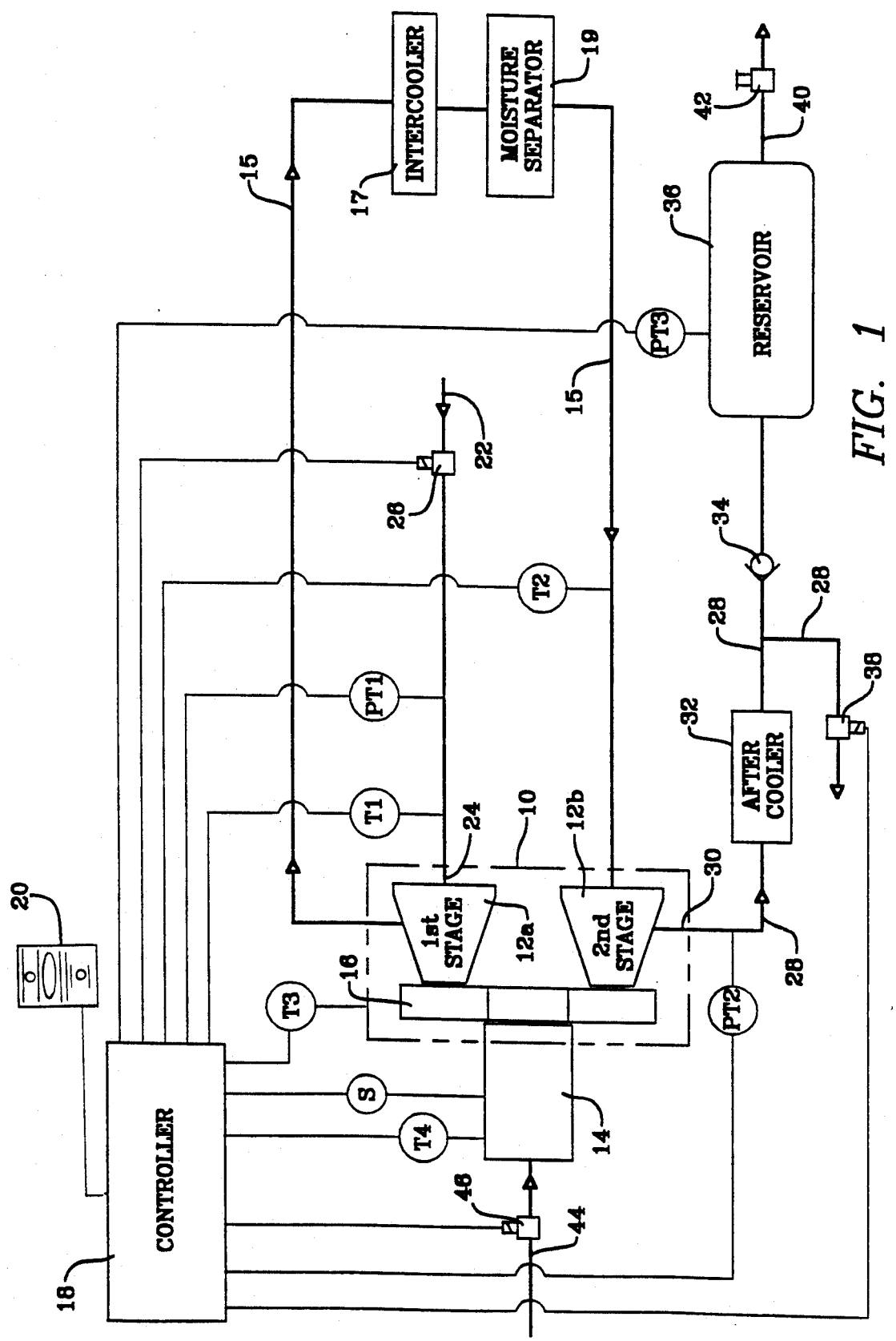
FIG. 1 is a schematic view illustrating an embodiment of the controller and associated connections for a centrifugal compressor utilizing prime drivers of the present invention.
Figure 7:
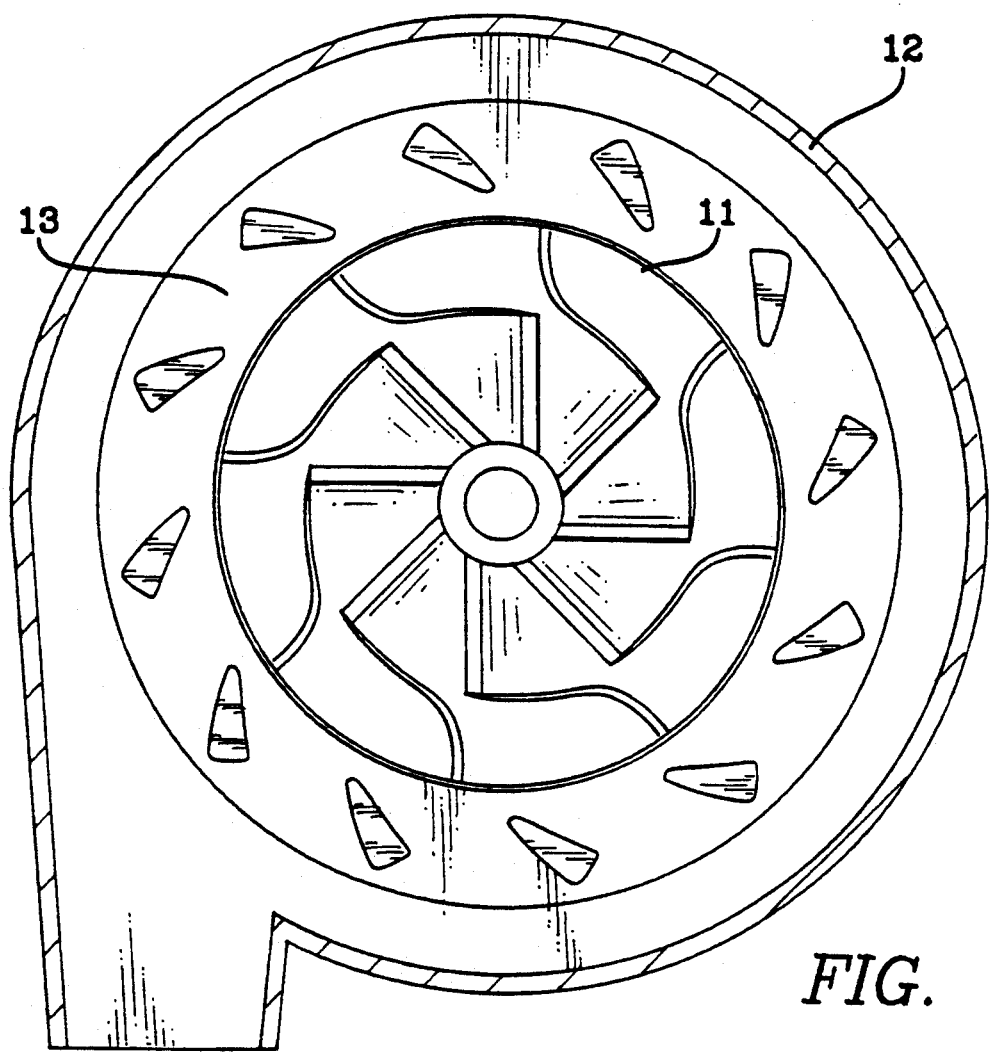
FIG. 7 is a cross sectional view of a compressor stage, incorporating the centrifugal impeller and diffuser portion.

A compressor 10 incorporates one or more compressor stages 12a, 12b. Only two compressor stages 12a, 12b are illustrated in FIG. 1, although anywhere from one to ten or more compressor stages may be used in series. FIG. 7 illustrates a view of each compressor stage 12 in which a compressor element 11 discharges fluid into a diffuser portion 13. The diffuser portion is configured to decrease the velocity of the fluid passing from the compressor element 11 and thereby increase the pressure of the working fluid. The term compressor as used through this specification applies to pumps and compressors as well as any device which displaces a working fluid. FIG. 7 illustrates a centrifugal type compressor element 11, even though any other type of well known compressor element such as other rotary or reciprocating type compressors may be used in this application.

Referring to FIG. 1, the compressor stages 12a, 12b are driven through a series of gears 16 which are, in turn, driven directly by an internal combustion engine prime driver 14. The angular velocity at which the compressor elements 11 of each of the compressor stages 12a, 12b, will operate at will be a constant ratio of the angular velocity of the internal combustion engine prime driver, depending upon the gearing ratios of the gears 16 used. Typically, the compressor elements of the latter compressor stages 12b will operate at a higher angular velocity to produce a higher discharge pressure than the compressor elements 11 of the earlier compressor stages 12a.

In internal combustion engine prime drivers, the angular velocity is affected by ambient temperatures and ambient pressures as well as loads. Therefore, limiting the fluctuation of the angular velocity of internal combustion engine prime drivers over time is difficult. Diesel prime drivers are preferred over other internal combustion engine prime drivers, for many applications, due to their increased reliability and economy.

An inlet conduit 22 is connected to an inlet port 24 and supplies working fluid to the first stage 12a of the compressor 10. An inlet valve 26 regulates fluid flow to the inlet conduit 22. The performance of the compressor 10 depends upon its inlet conditions. Therefore, it is common to place a pressure sensor or transducer PT1 and a temperature sensor or transducer T1 in a position to sense fluid pressure and temperature, respectively, within the inlet conduit 22.

The first stage 12a and the second stage 12b communicate, in series, via an interstage conduit 15. An intercooler 17 and a moisture separator 19 are disposed in the interstage conduit to reduce the temperature and the moisture content of the working fluid passing between the two stages to a sufficient condition where it can undergo the further compression of the second stage. An interstage temperature sensor or transducer T2 is in fluid communication with the interstage conduit 15.

The discharge of the last (in this case second) stage 12b is in communication with a discharge conduit 28. The discharge conduit 28 connects to the discharge port 30 of the last compressor stage 12b. The discharge is in fluid communication via an aftercooler 32 and a check valve 34 to a reservoir 36. The aftercooler 32 conditions the working fluid after it exits the compressor 10. The check valve 34 limits return working fluid passage once the working fluid passes from the discharge conduit 28 to the reservoir 36, but should not affect passage of the working fluid from the discharge conduit 28 to the reservoir 36. Also in fluid communication with the discharge conduit 28 is a blowoff valve 38. The blowoff valve 38 is used to vent compressed air to the atmosphere to keep the compressor pressure ratio from exceeding a predetermined maximum value.

A service line 40 is in fluid communication with the reservoir 36. A service valve 42 controls fluid flow through the service line. The service line 40—service valve 42 combination is constructed in a manner well known in the art so that the user can get access to the working fluid stored in the reservoir 36.

The angular velocity of the internal combustion engine prime driver 14 is controlled by fuel flow through a fuel line 44, which is regulated by a fuel valve 46 in a manner known in the art. Ideally, the greater the fluid flow through the fuel line 44 to the internal combustion engine prime driver 14, the faster will be the angular velocity of the internal combustion engine prime driver 14 and thereby the angular velocities of the compressor elements 11 of the compressor stages 12a, 12b as described above. The position of the fuel valve 46 is directly controlled by the controller 18. In this manner, the angular velocity of the compressor elements 11 in the compressor stages 12a and 12b (and also the angular velocity of the internal combustion engine prime driver 14) are controlled by direct input signals from the controller 18 based upon feedback from different sections of the compressor means 10 and/or the internal combustion engine prime driver 14, as described below.

The controller 18 is of an electronic type, and is preferably microprocessor or microcomputer based. A microcomputer which may be used in this application is the INTEL 80C196 (INTEL is a trademark of the Intel Corporation). An interface panel 20 is electronically coupled to the controller 18 in a manner which permits the operator to input setpoints or other operating parameter criteria to the controller 18. To simplify operation, the interface panel of this embodiment permits the operator to select a value for the setpoint reservoir pressure, and the controller 18 will control the operation of the compressor, as described below, to achieve the desired setpoint reservoir pressure in a highly efficient manner.

Several temperature sensors or transducers feed input to the controller 18. These temperature sensors include the ambient temperature sensor T1 which determines the ambient temperature of the working fluid just prior to entering the compressor. An interstage temperature sensor T2 determines the temperature of the working fluid between multiple stages (there are only two stages 12a and 12b illustrated in FIG. 1, but for each additional stage connected in series, another interstage temperature sensor T2 becomes necessary). A lube oil temperature sensor T3 senses the temperature of oil in an oil sump (not illustrated) of the compressor 10. An engine coolant temperature sensor T4 determines the temperature of the cooling fluid in the prime driver 14.

There are several pressure sensors or transducers which determine different pressures whose outputs are fed to the controller 18. These include the inlet pressure sensor PT1 which determines the ambient pressure of the working fluid as sensed by the compressor. A compressor discharge pressure sensor PT2 determines the output pressure of the working fluid in the compressor discharge 30. A reservoir pressure sensor PT3 senses the pressure of the working fluid stored in the reservoir.

There is a prime driver angular velocity sensor S which determines the angular velocity of the prime driver 14. Since the ratio of angular velocities between the internal combustion engine prime driver 14 and the centrifugal impeller 11 is constant for each stage 12a, 12b (regardless of angular velocity of the internal combustion engine prime driver 14), then the angular velocity of each of the stages can be computed from the angular velocity of the internal combustion engine prime driver 14 as indicated by prime driver angular velocity sensor S.

The mechanisms which the controller 18 may utilize to control compression of the working fluid by the compressor means 10 include control of the fuel valve 46, control of the inlet valve 26 and control of the blowoff valve 38. Since the fuel valve 46 has such intimate control of operation of the internal combustion engine prime driver 14 and the compressor 10, the control logic of the present invention is especially concerned with the positioning of the fuel valve 46.

The logic of controlling the angular velocity of the compressor 10 is largely based upon the premise that for each desired pressure at reservoir 36 there is a range of speeds over which the internal combustion engine prime driver may be operated. The higher ends of this range represent inefficient usage of the compressor 10 since the compressor will be producing more fluid than is necessary and the associated mechanical losses will be higher. The difficulty arises in controlling prior internal combustion engine prime drivers to constantly operate at or near the most efficient value of angular velocities regardless of changing ambient temperature and ambient pressure (since these values may fluctuate). The present invention provides a system to maximize the efficiency by operating the compressor at the minimum angular velocity for which the desired pressure and flow can be maintained considering the prevailing inlet conditions.

The logic utilized by the controller 18 in controlling the inlet valve 26 and the blowoff valve 38 are detailed in latter portions of this disclosure. These logic portions do utilize feedback from the logic used in controlling the fuel valve 46.

The controller 18 is capable of operating the compressor 10 in nine different modes selected by the operator and/or operation of the controller 18. The mode of operation of the compressor 10 and the internal combustion engine prime driver are inserted into the logic of the control loops (FIGS. 4, 5 and 6) via user input through the interface panel 20. The first mode being that the prime driver and the compressor are both in an off state. The second mode is that the controller power is on but the machine is not operating. Mode three is the startup mode for the internal combustion engine prime driver. Mode four is a low idle control for the engine while the compressor is delivering little air. Mode five is initial load mode where the internal combustion engine prime driver speed is increased and the compressor is loaded, with the control loops for the inlet valve and the blowoff valve being actuated. Mode 6 is used when the prime driver is at typical operating speed while the compressor is in the unloaded state.

Mode seven has two portions consisting of mode seven-A and mode seven-B. Mode seven-A is normal operating mode where the compressor is delivering air at the selected discharge pressure and the engine is running at a constant speed, with pressure control being achieved by modulation of the inlet valve 26. Mode seven-B is a speed up mode which is entered when the set point pressure is not achievable with the prime driver operating at normal run speed. Mode seven-B incrementally increases the compressor speed by accelerating the internal combustion engine prime driver until either the set point pressure is achieved at the reservoir 36 or the compressor reaches its maximum operating speed. Mode eight is a constant speed mode for test purposes in which the inlet valve is kept wide open and the discharge pressure is controlled by the blowoff valve. Mode nine is a shutdown state due to any particular alarm, which results in the prime driver decelerating to a stop state.

Figure 2:
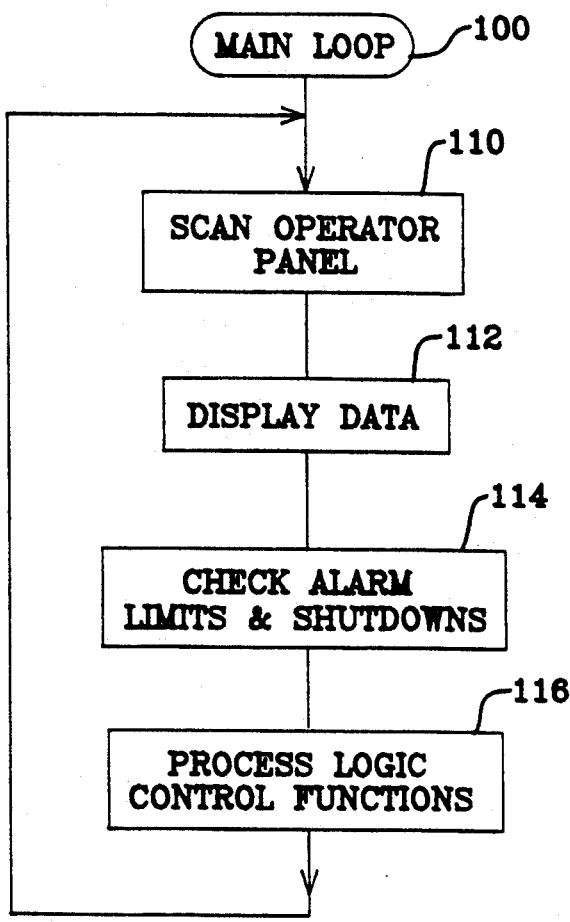
FIG. 2 is a flow chart containing the logic for one embodiment of the main loop for the logic contained in the controller.
Figure 3:
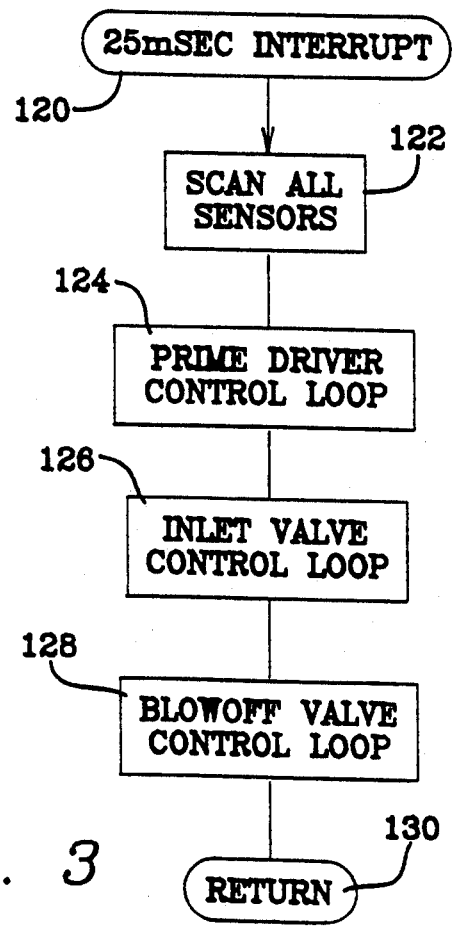
FIG. 3 is a flow chart for an interrupt sequence contained in one embodiment of the present invention.

The controller 18 controls the operation of the compressor utilizing the logic flowcharted in FIGS. 2-6 and 8. FIG. 2 illustrates a main loop 100 including four steps. The steps of the main program are the Scan Operator Panel step 110, the Display Requested Data (from step 110) step 112, the Check Alarm Limits and Shutdown step 114 and the Process Logic Control Functions step 116. The controller repeatedly executes the main loop 100. Each 25 mSec the execution of the main loop is interrupted by the 25 mSec interrupt loop which is illustrated in FIG. 3. The operation of the 25 mSec loop is described later on.

The Scan Operator Panel step 110 scans the operator panel for inputs from the operator's panel 20. The possible inputs are the start, stop, load, unload compressor functions, the desired operating parameters including compressor discharge pressure (setpoint pressure) and what type of operation the compressor is going to be exposed to. The operator panel typically has LCD displays, and the input information may be selected from a scroll type input as is well known in the art.

The Display Data step 112 displays data as selected from the Scan Operator Panel step 110. The data will appear on the operators panel 20. The data which appears may be either as directly selected from the operator, or it may display the values of a few functions as is well known in the art.

The Check Alarm Limits And Shutdowns step 114 checks the values of the pressure, temperature and speed transducers (including transducers which perform functions not described in this specification) and determines if any of the values are sufficient to place the compressor in a dangerous situation.

Figure 4:
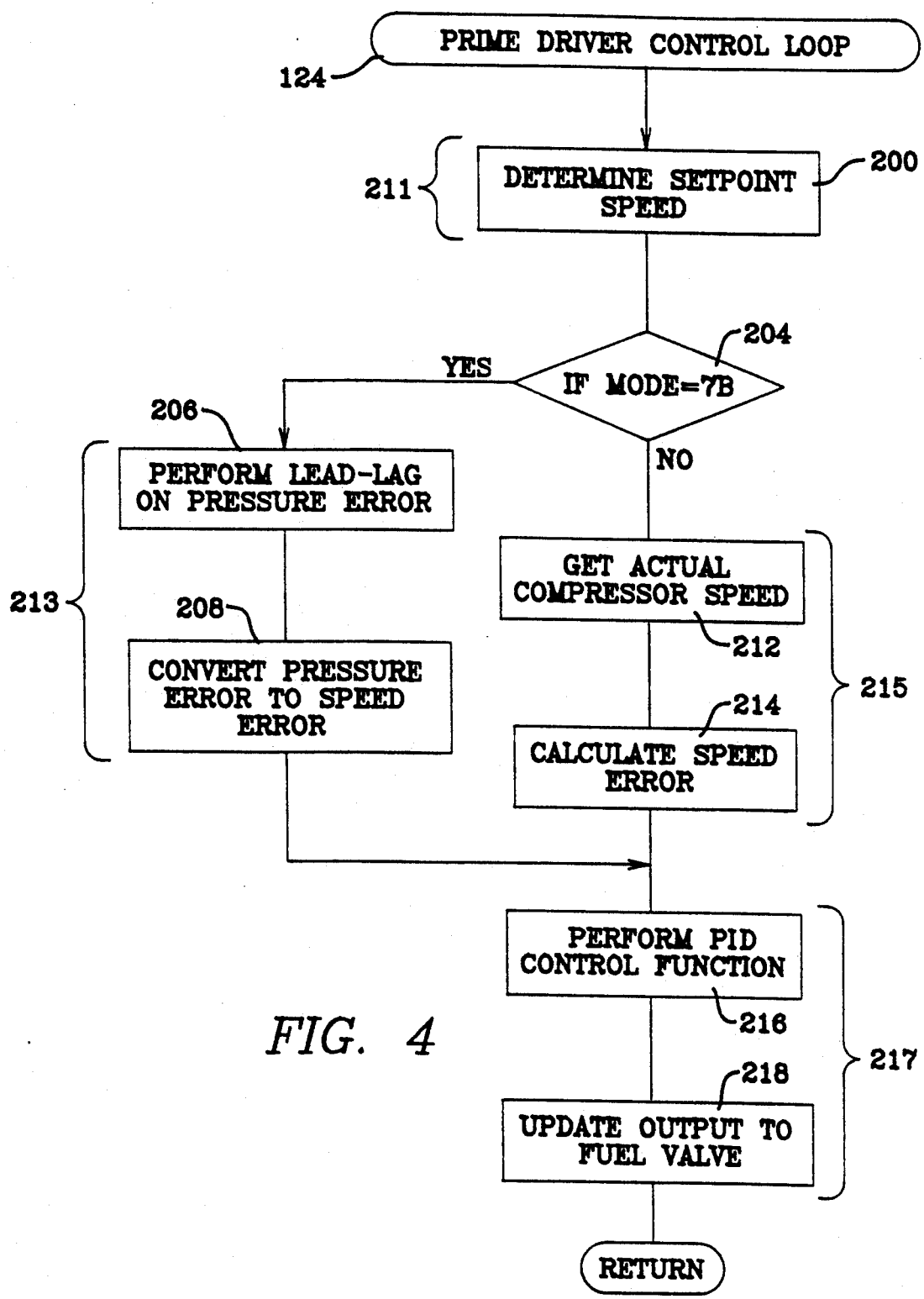
FIG. 4 is a flow chart for a prime driver control loop utilized in one embodiment of the present invention.
Figure 5:
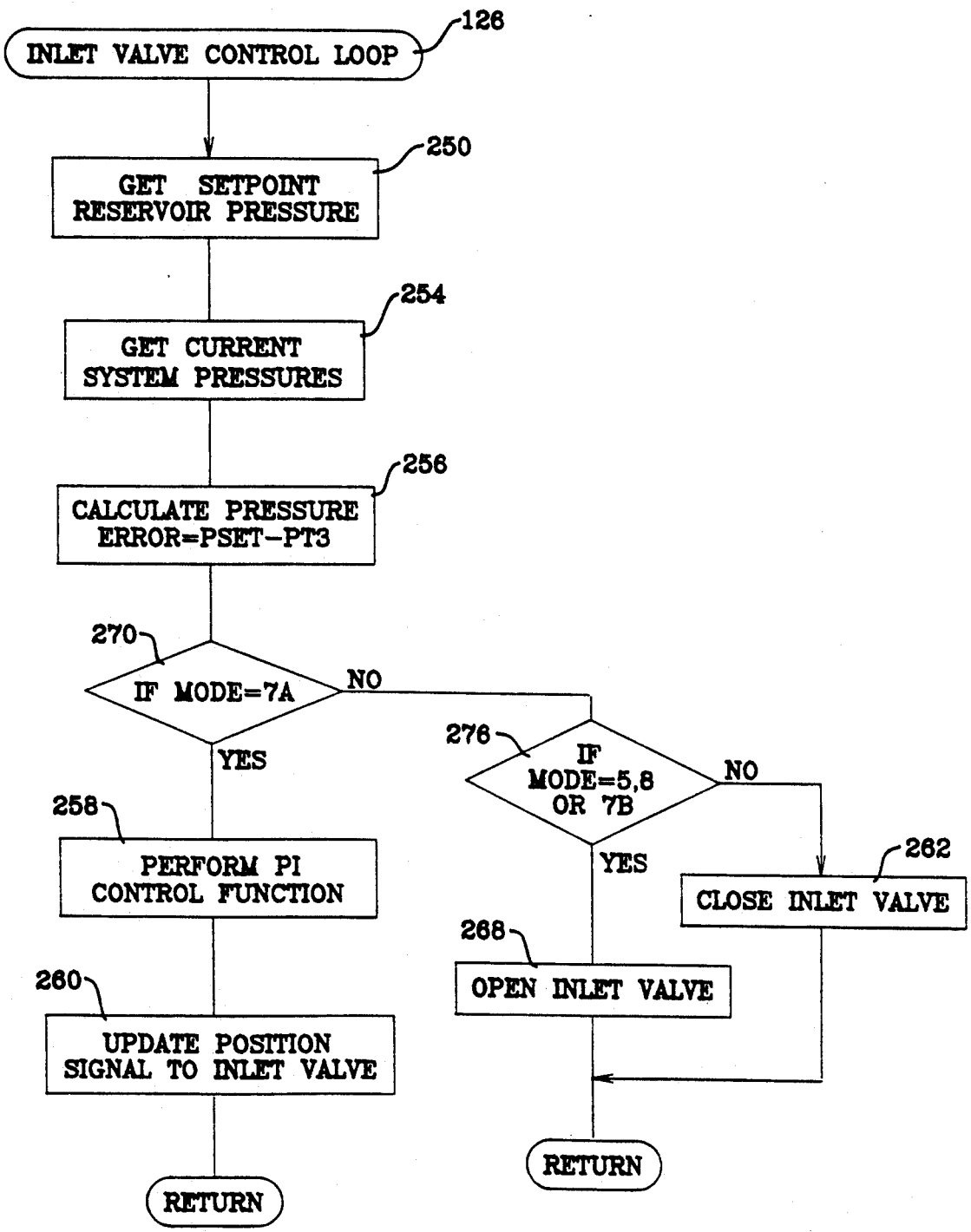
FIG. 5 is a flow chart for an inlet valve control loop utilized in one embodiment of the present invention.
Figure 6:
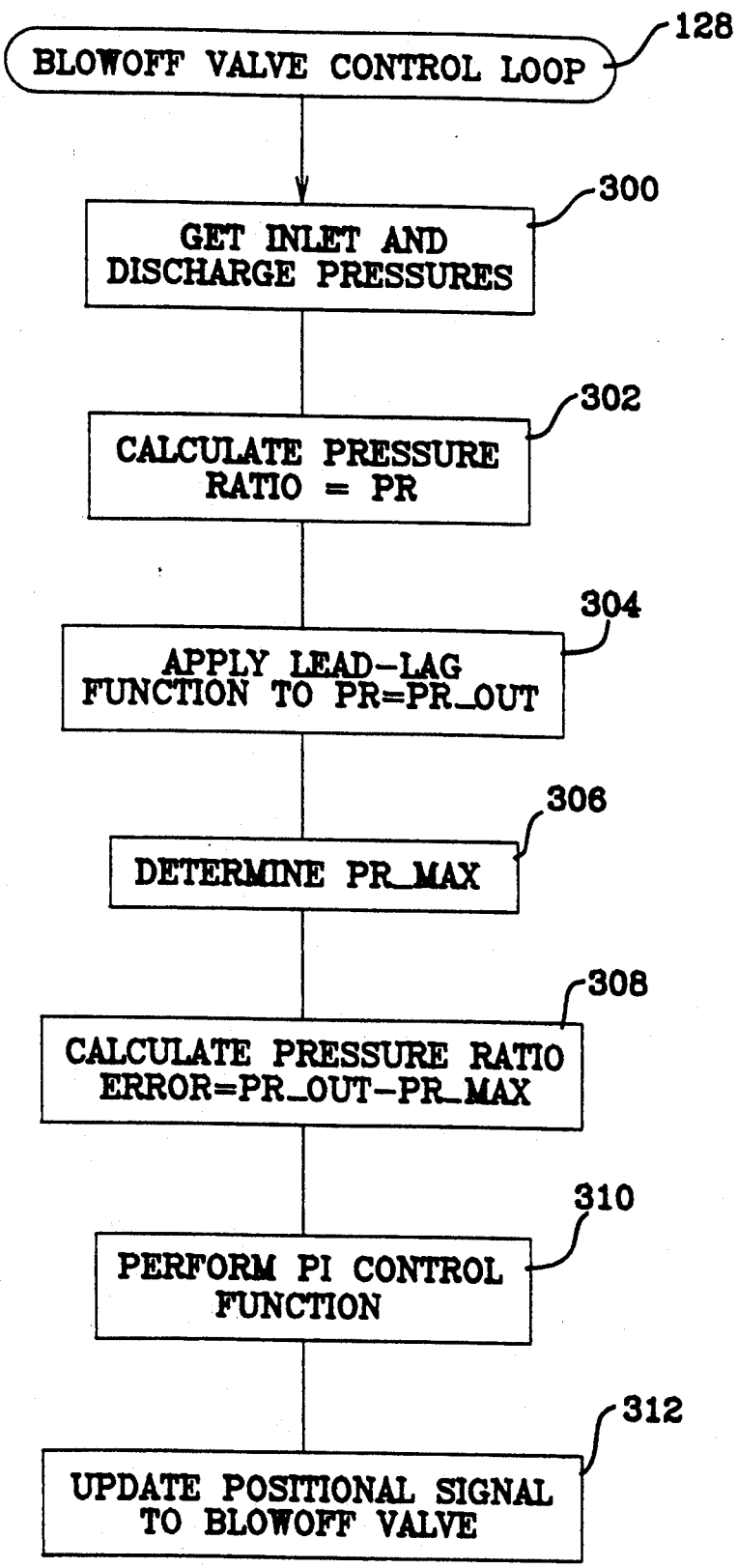
FIG. 6 is a flow chart for a blowoff valve control loop utilized in one embodiment of the present invention.

The 25 mSec interrupt loop 120 illustrated in FIG. 3 contains four steps, which are the Scan All Sensors step 122, the Prime Driver Control Loop step 124, the Inlet Valve Control Loop step 126 and the Blowoff Valve Control Loop step 128. The logic of the latter three steps is illustrated in FIGS. 4, 5 and 6 respectively, and is described later on.

The Scan All Sensors step 122 scans the readings of the ambient temperature sensor T1, the interstage temperature sensor T2, the lube oil temperature sensor T3 and the engine coolant temperature sensor T4. The Scan All Sensors step also senses the pressure of the inlet pressure sensor PT1, the discharge pressure sensor PT2 and the reservoir pressure sensor PT3 as well as the prime driver angular velocity sensor S.

The Scan All Sensors step 122, also scans the readings of other pressure, temperature and fluid level transducers in the system (not illustrated but well known in the art) to check for shutdown conditions. The Scan All Sensors step 122 contains instructions to shut off the compressor if any of the critical parameters (as sensed by temperature sensors T1, T2, T3 or T4; pressure sensors PT1, PT2 or PT3 as well as speed sensor S, and the other sensors not shown) checked fall outside of predetermined allowable limits.

The Scan All Sensors step 122 will check whether any temperature or pressure transducer is giving unreliable readings by providing readings outside of predetermined limits which the specific transducer is unlikely to see. For example, when the blowoff valve 38 is closed, the inlet valve 26 is open and the internal combustion engine prime driver 14 is operating at a relatively high rotational velocity, then there should be considerable fluid pressure applied to discharge pressure sensor PT2. If the actual signals under these conditions from PT2, to the controller 18, indicate either a near zero pressure, or a pressure much higher that the compressor is capable of producing, then there is reason to believe that the pressure transducer is giving unreliable indications. Under these conditions, the controller using the logic contained in the Scan All Sensors step 122 will (if the sensor is a critical one) shut down the compressor and indicate, through the interface panel 20, that the element is acting improperly. Otherwise, it will continue operation of the compressor and indicate on the interface panel 20 the malfunction. An inaccurate indication from each pressure sensor, temperature sensor or speed sensor will result in similar responses by the controller 18 and the interface panel 20.

CONTROL LOOPS

The three control loops (the Prime Driver Control loop 124, the Inlet Valve Control loop 126 and the Blowoff Valve Control loop 128, Which are illustrated in FIGS. 4, 5 and 6, respectively) comprise the logic which the controller 18 utilizes in controlling the efficient production of the setpoint reservoir pressure of the compressor 10. The Prime Driver Control loop 124 controls the speed of the internal combustion engine prime driver 14 so that it can operate at or near its minimum angular velocity and still produce the setpoint reservoir pressure. The Inlet Valve Control loop 126 controls or modulates the position of the inlet valve 26 as is necessary to load or unload the compressor. The Blowoff Valve Control loop 128 controls or modulates the position of the blowoff valve 38 to precisely control the discharge port (and reservoir) pressure, and limits the occurrence of surge or recovery therefrom as is well known.

The Prime Driver Control loop 124 contains seven steps and one decision. The seven steps are a Determine Setpoint Speed step 200, a Perform Lead-Lag On Pressure Error step 206, a Convert Pressure Error to Speed Error step 208, a Get Actual Compressor Speed Step 212, a Calculate Speed Error step 214, a Perform PID Control Function step 216 and an Update Output To Fuel Control Valve step 218. The one decision is the If Mode=7b decision 204.

The Prime Driver Control loop 12 includes four portions. The first portion is an Operating Parameter portion 211 which includes the Determine Setpoint Speed step 200. The second portion is a pressure portion 213 which includes the Perform Lead-Lag on Pressure Error step 206 and the Convert Pressure Error to Speed Error step 208. The third portion is a speed error portion 215 which includes the Get Actual Compressor Speed step 212 and the Calculate Speed Error step 214. The fourth portion is the speed adjustment portion 217 which includes the Perform PID Control Function step 216 and the Update Output To Fuel Valve step 218.

The Determine Setpoint Speed step 200 calculates the minimum angular velocity (G1SET) which the internal combustion engine prime driver is capable of operating at and still provide motive force so the compressor is capable of delivering the setpoint reservoir pressure, as selected by the user on the interface panel 20. The Determine Setpoint Speed step 200 receives data from the ambient pressure sensor PT1 and the ambient temperature sensor T1, and determines the setpoint speed approximately once every five minutes.

The setpoint speed of the internal combustion engine prime driver will vary based upon the mode of operation. In mode 4, for example, the setpoint speed is set to an idle speed. When the internal combustion engine prime driver and compressor are operating in mode 7a, the setpoint speed (G1SET) is calculated as follows:

$$G1SET = MAX\ [MIN\ (G1HP,\ GFLOW),\ GSURGE]$$

where,

G1SET = Setpoint Speed
G1HP = Speed at which the required engine horsepower is equal to a predetermined percentage of the rated engine horsepower
GFLOW = Speed at which the delivered compressor flow is equal to the rated flow
GSURGE = The minimum speed for which an adequate surge margin is maintained. GSURGE is only applicable to centrifugal compressors and pumps. When this control system is applied to non-centrifugal compressors or pumps driven by internal combustion engine prime drivers, the GSURGE portion of this and the following equations is omitted.

Figure 8:
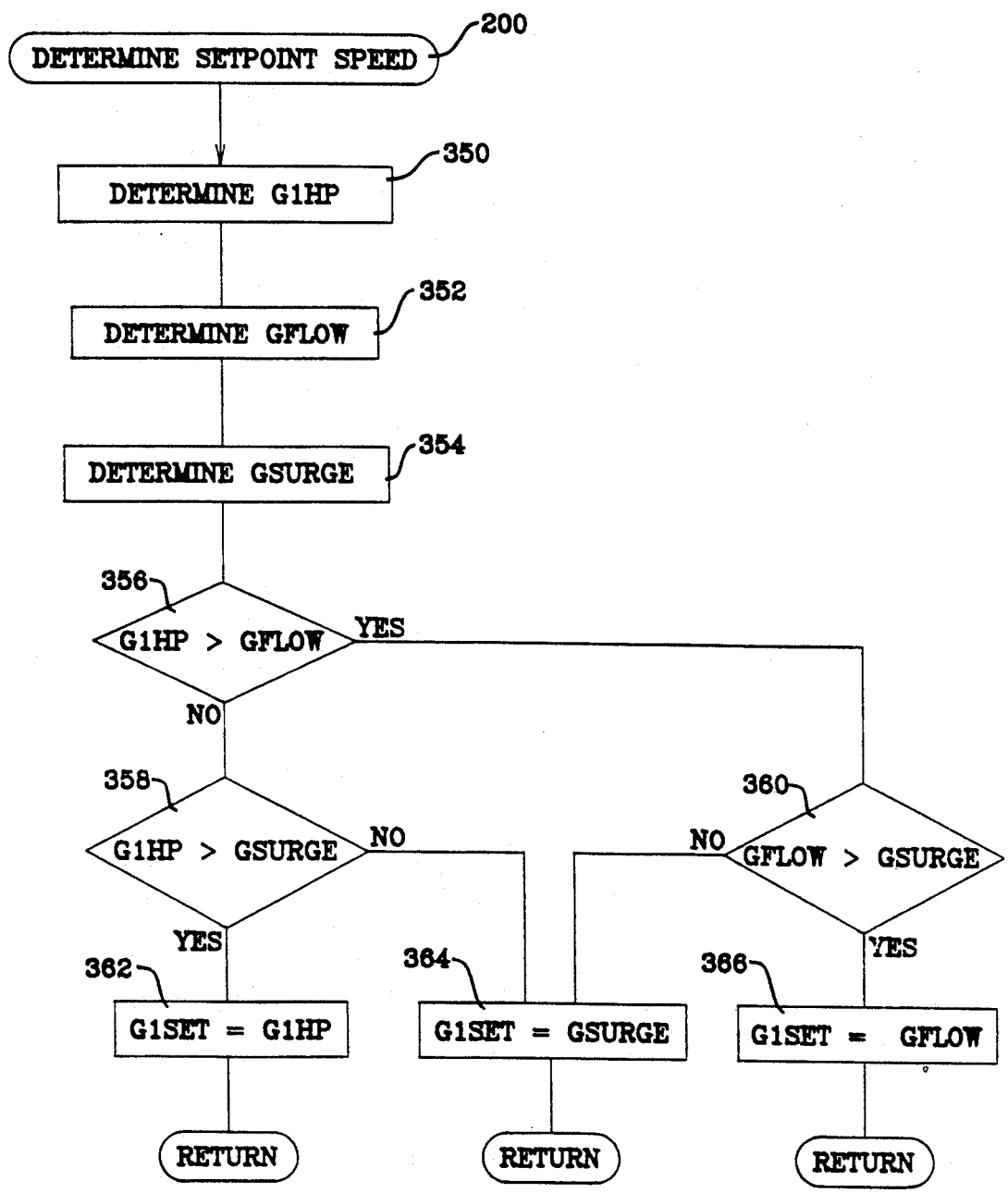
FIG. 8 is a flowchart of the Determine Setpoint Speed step 200 of FIG. 4.

As indicated in the above equation and FIG. 8, the Determine Setpoint Speed (G1SET) step 200 utilizes the results from the Determine G1HP step 350, the Determine GFLOW step 352 and the Determine GSURGE step 354 (determined as described below). Decision 356 stores the value of the minimum of G1HP and GFLOW as a minimum value. The maximum value of the minimum value and GSURGE are determined by decisions 358 and 360, and the appropriate value is equated to G1SET as illustrated in steps 362, 364 or 366.

G1HP, GFLOW and GSURGE are specific functions of ambient temperature, ambient pressure and setpoint pressure. GFLOW and G1HP are determined by linearly interpolating the results of a performance analysis of the compressor system at different values of ambient pressure, ambient temperature and setpoint pressure. In general:

$$G1HP = A + B \times T1, \text{ and}$$

$$GFLOW = C + D \times T1, \text{ where}$$

T1 = Compressor Inlet Temperature, in Degrees Rankine (Measured From T1).

A, B, C and D are linear functions of ambient pressure and setpoint pressure, as determined from the performance analysis, which vary depending upon the specifics of the compressor 10 and the internal combustion engine prime driver 14 (as does GSURGE). GSURGE is determined from experimentally derived surge line data (not illustrated but well known in the art), which consist of the pressure ratio at surge versus corrected speed for centrifugal compressors.

$$GSURGE = FC \times Squareroot(T1/Z) \times GC, \text{ where}$$

Z = A constant.
FC = Surge Margin Factor, Generally 1.08 or larger; and
GC = Corrected Speed at which surge occurs at the required pressure ratio (REQD_PR).
REQD_PR = Required Pressure Ratio = (PSET + DP2)/PT1, where
PSET = Setpoint Reservoir Pressure;
DP2 = Discharge Conduit pressure drop (Measured difference between PT3 and PT2); and
PT1 = Ambient Pressure at Compressor Inlet (Measured from PT1).

The pressure portion 213 includes the Perform Lead—Lag on Pressure Error step 206 and the Convert Pressure Error to Speed Error step 208. The Perform Lead—Lag on Pressure Error step 206 is a standard compensation well known in the art. The Convert Pressure Error to Speed Error step 208 determines, based upon the pressure error determined from step 206, whether the internal combustion engine prime driver 14 should be accelerated or decelerated to maintain the reservoir pressure at the setpoint.

In the speed error portion 215, the Get Actual Compressor Speed step 212 determines the actual angular velocity of the internal combustion engine prime driver 14 as indicated by the internal combustion engine prime driver speed angular speed sensor S. Step 214 calculates the speed error based on the setpoint from step 200.

In the speed adjustment portion 217, the speed error is sent to the Perform PID (Proportional Integral Differential) control function step 216. The PID control function calculates the position change of the fuel valve so as to reduce the speed error in a manner well known in the art. A term which appropriately describes the PID control function is modulation of the fuel valve. The Update Output To The Fuel Valve step 218 applies a signal from the controller 18 to modulate the fuel valve 46 the desired amount as determined from step 216.

FIG. 5 illustrates the Inlet Valve Control loop 126 which contains seven steps and two decisions. The seven steps are the Get Setpoint Reservoir Pressure (PT3) step 250, the Get Current System Pressures step 254, the Calculate Pressure Error step 256, the Perform PI Control Function step 258, the Update Positional Signal To Inlet Valve step 260, the Close Inlet Valve step 262 and the Open Inlet Valve step 268.

The Inlet Valve Control loop 126 permits positioning of the inlet valve depending upon what mode the compressor is being operated in. The Get Setpoint Reservoir Pressure step obtains the setpoint reservoir pressure as set by the user on the interface panel 20. The setpoint reservoir pressure is used, as described above, in obtaining the setpoint speed in step 200.

The Get Current System Pressures step 254 determines the values of all the pressures of the pressure sensors or transducers PT1, PT2 and PT3, even though only the first and last are necessary for the operation of the Inlet Valve Control loop 126. The logic of the entire Inlet Valve Control loop will be able to be performed based upon the information of steps 250 and 254.

Under normal conditions the controller operates the system in mode 7a. In this case, the Perform PI Control Function step 258 is executed to calculate the change in the control signal to the inlet valve. Next, the Update Position Signal To Inlet Valve Step 260 is performed to adjust the inlet valve position.

If the setpoint pressure cannot be achieved in mode 7a, the controller switches to mode 7b and attempts to achieve it by speeding up. In this case, as in modes 5 and 8, the inlet valve is held full open by performing the Open Inlet Valve step 268.

If the mode is modes 3, 4, 6 or 9 when the Inlet Valve Control loop 126 is entered, then the logic of the Close Inlet Valve step 262 will be performed.

The Blowoff Valve Control loop acts to control the pressure ratio (defined as PT2/PT1 which equals the compressor discharge pressure divided by the compressor inlet pressure) so that it does not exceed a programmed value, PRmax, which is a function of ambient temperature and prime driver speed. FIG. 6 illustrates the Blowoff Valve Control Loop 128 which includes seven steps. These include a Get Inlet And Discharge Pressures step 300, a Calculate Pressure Ratio step 302, an Apply Lead-Lag Function to PR step 304, a Determine PRmax step 306, a Calculate Pressure Error step 308, a Perform PI Control Function step 310 and an Update Positional Signal To Blowoff Valve step 312.

The Get Inlet And Discharge Pressures step 300 obtains an inlet pressure to the first stage 12a of the compressor 12a from PT1, and determines the discharge pressure from the last stage 12b of the compressor via PT2. The Calculate Pressure Ratio step 302 determines the pressure ratio by dividing the outlet pressure by the inlet pressure (from the values obtained in step 300).

The Apply Lead—Lag Function To PR step 304 provides compensation to the pressure ratio to increase the response rate of the control loop. The Determine PRmax step 306 determines which maximum pressure ratio (PRmax) the compressor can be run at to avoid the onset of surge considering the ambient temperature, the ambient pressure and the internal combustion engine prime driver speed, in a manner well known in the art. The Calculate Pressure Ratio Error step 306 computes the error between the actual pressure ratio and the maximum allowable pressure ratio by subtracting the value obtained in step 306 from the value obtained in step 304. The Perform PI Control Function step 310 determines a position that the blowoff valve should be in considering the value of the error obtained in step 308. The Update Positional Signal To Blowoff Valve step 312 sends a signal to the blowoff valve 38, based upon the value obtained in step 310.

While this invention has been illustrated and described in accordance with a preferred embodiment, it is recognized that other variations and changes may be made therein without departing from the invention a set forth in the claims.

Having described the invention, what is claimed is:

1. An apparatus comprising:
   compressor means for compressing a working fluid to be discharged into a reservoir, the compressor means including at least one compressor element;
   prime driver means, capable of operating at varying angular velocities, for applying motive force to the compressor means;
   ratio means, disposed between each compressor element and the prime driver means, for ensuring that a ratio defined as an angular velocity of the compressor element divided by the angular velocity of the prime driver means remains constant;
   a controllable fuel valve means in communication with the prime driver means, positionable for controlling a fuel flow to the prime driver means; and
   controller means for positioning the fuel valve means based upon a combination of parameters including a variable setpoint reservoir pressure, ambient pressure and ambient temperature, wherein the prime driver means is operated at an angular velocity at which the actual pressure of the reservoir can be maintained at the setpoint reservoir pressure.

2. The apparatus as described in claim 1, wherein the combination of parameters further comprises:
   a difference between the variable setpoint reservoir pressure and a present pressure at the reservoir.

3. The apparatus as described in claim 1, wherein the controller means further comprises:
   setpoint adjustment means for increasing fluid pressure in the reservoir when the compressor has been operating for a specified period, and the fluid pressure in the reservoir has not achieved the setpoint reservoir pressure.

4. The apparatus as described in claim 1, wherein the ratio means includes a gear arrangement.

5. The apparatus as described in claim 1, wherein for a given variable setpoint reservoir pressure, the angular velocity will be determined based upon the ambient pressure and the ambient temperature.

6. The apparatus as described in claim 1, wherein the controller means also performs diagnostics of the prime driver means.

7. The apparatus as described in claim 1, wherein the prime driver means is internal combustion engine powered.

8. The apparatus as described in claim 1, wherein the prime driver means is operated at substantially the lowest angular velocity possible to maintain the actual pressure of the reservoir at the setpoint reservoir pressure.

9. The apparatus as described in claim 1, wherein the controller means is electronically based.

10. The apparatus as described in claim 9, wherein the controller means is microprocessor based.

11. The apparatus as described in claim 1 wherein the apparatus further comprises:
- a discharge conduit partially containing fluid passing from the compressor discharge;
- a positional blowoff valve means in communication with the discharge conduit, for permitting fluid passage therefrom to the atmosphere, positioning of the blowoff valve means being controlled by the controller means; and
- an adjustable inlet valve means for controlling fluid flow to the compressor means, adjustment of the adjustable inlet valve means being controlled by the controller means.

12. The apparatus as described in claim 11, wherein logic of the controller means includes a fuel valve control loop for positioning one of the blowoff valve means and the inlet valve means based on the setpoint reservoir pressure and the present pressure in the reservoir.

13. The apparatus as described in claim 1, wherein the compressor means further comprises:
- an adjustable inlet valve means for controlling fluid flow to the compressor means.

14. The apparatus as described in claim 13, wherein the controller means also positions the adjustable inlet valve means.

15. The apparatus as described in claim 1, wherein the compressor means further comprises:
- a discharge conduit partially containing fluid passing from the compressor discharge; and
- a positional blowoff valve means in communication with the discharge conduit, for permitting fluid passage therefrom to the atmosphere.

16. The apparatus as described in claim 3, wherein the contorller means also positions the positional blowoff valve means.

17. An apparatus comprising:
- a compressor having a compressor element, an inlet port and a reservoir;
- a prime driver means rotationally coupled to the compressor element, for driving the compressor, wherein an angular velocity of the prime driver means and an angular velocity of the compressor element are always maintained at a constant ratio;
- a contorller means, for controlling the angular velocity of the prime driver means based upon a group of parameters including a variable setpoint reservoir pressure, ambient temperature and ambient pressure, wherein the prime driver means is operated at an angular velocity at which it is possible to maintain the actual pressure of the working fluid within the reservoir at the setpoint reservoir pressure;
- computer logic, utilized by the controller means, including a fuel valve control loop; and
- setpoint means, whereby for each setpoint reservoir pressure setting, the fluid valve control loop computes a distinct value of angular velocity of the prime driver means based upon ambient temperature and ambient pressure, and the controller means adjusts the angular velocity of the prime driver means based upon the value of the distinct value.

18. The apparatus as described in claim 17, wherein the computer logic further comprises:
- an inlet valve control loop and a blowoff valve control loop.

19. The apparatus as described in claim 17, wherein the computer logic further contains:
- operational modes means for the user to determine the mode which the compressor means is operating, wherein the logic of the inlet valve control loop and the blowoff valve control loop are based upon the setpoint reservoir pressure setting, the actual pressure of the reservoir and the operational mode means.

20. The apparatus as described in claim 17, wherein the contorller means provides diagnostic functions for the compressor and the prime driver means.

21. The apparatus as described in claim 17, wherein the prime driver means is operated at substantially the lowest angular velocity at which it is possible to maintain the actual pressure of the reservoir at the setpoint reservoir pressure.

22. The apparatus as described in claim 17, wherein the prime driver means is internal combustion engine powered.

23. The controller means as described in claim 17, further comprising:
- an interface panel means for permitting the user to alter the setpoint reservoir pressure setting.

24. The controller means as described in claim 23, wherein the controller means includes a microprocessor.

25. The controller means as described in claim 23, wherein the controller means includes a microcomputer.

26. In a fluid system including a compressor, a method for controlling an angular velocity of a compressor element, the method comprising the steps of:
- maintaining a predetermined, constant ratio between the angular velocity of the compressor element and an angular velocity of a prime driver, the prime driver driving the compressor element;
- sensing a predetermined setpoint reservoir pressure;
- sensing, in the fluid system, an ambient temperature, and an ambient pressure;
- inputting to a controller the ambient temperature, the ambient pressure, and the setpoint reservoir pressure;
- computing a desired prime driver angular velocity to achieve a desired setpoint reservoir pressure, the prime driver angular velocity being based upon the ambient temperature, the ambient pressure and the setpoint reservoir pressure; and adjusting the angular velocity of the prime driver to the desired prime driver angular velocity by regulating a fuel flow to the prime driver.

27. The method as described in claim 26, wherein the fuel flow to the prime driver is substantially the lowest fuel flow which will accomplish the setpoint reservoir pressure.

28. The method as described in claim 26, wherein the computing step utilizes a microprocessor.

29. The method as described in claim 26, wherein the computing step utilizes a microcomputer.

30. The method as described in claim 26, wherein the angular velocity adjusting step further comprises the steps of:
   determining a GIHP value and a GFLOW value; and
   assigning the minimum of the GIHP and GFLOW values as a minimum value.

31. The method as described in claim 26, wherein the angular velocity adjusting step further comprises the steps of:
   determining a GSURGE value; and
   assigning the maximum of the minimum value and the GSURGE value as a maximum value.

* * * * *